US012437677B2

(12) United States Patent
Ward

(10) Patent No.: US 12,437,677 B2
(45) Date of Patent: Oct. 7, 2025

(54) HANGING HOME DECORATION ASSEMBLY AND METHOD OF USE

(71) Applicant: Sarah Ward, Indianapolis, IN (US)

(72) Inventor: Sarah Ward, Indianapolis, IN (US)

( * ) Notice: Subject to any disclaimer, the term of this patent is extended or adjusted under 35 U.S.C. 154(b) by 122 days.

(21) Appl. No.: 18/084,966

(22) Filed: Dec. 20, 2022

(65) Prior Publication Data

US 2024/0203295 A1 Jun. 20, 2024

(51) Int. Cl.
*G09F 7/22* (2006.01)
*A47G 1/20* (2006.01)
*G09F 7/18* (2006.01)

(52) U.S. Cl.
CPC ................. *G09F 7/18* (2013.01); *A47G 1/20* (2013.01); *G09F 2007/186* (2013.01)

(58) Field of Classification Search
CPC ..... G09F 17/00; G09F 7/00; G09F 2017/0041
See application file for complete search history.

(56) References Cited

U.S. PATENT DOCUMENTS 1,355,861 A * 10/1920 Spaulding ..................... 116/173
D134,583 S 12/1942 Woodward
3,910,226 A 10/1975 Mcgahee
4,356,647 A * 11/1982 Farris ...................... G09F 15/02 D6/300
5,291,849 A * 3/1994 Zeitler .................... G09F 17/00 116/173
5,655,325 A * 8/1997 Watkins .................. G09F 17/00 160/243
6,254,097 B1 * 7/2001 Larner ...................... A63F 3/06 273/287
6,419,231 B1 * 7/2002 Rivera .................. A63F 3/0423 273/272
6,688,027 B2 * 2/2004 Fink .......................... G09F 7/00 40/591
6,976,786 B1 * 12/2005 Stanley, Jr. ............. G09F 17/00 383/117
6,978,567 B1 * 12/2005 Pearsall .................. G09F 17/00 40/666
7,665,412 B2 * 2/2010 Walls ...................... G09F 17/00 40/586
8,776,714 B1 * 7/2014 Delaney, Jr. ............ G09F 17/00 40/604

(Continued)

OTHER PUBLICATIONS

Oxford Pennant; "Liberty for All Championship Banner • Chrome Yellow X Office of Brothers X Oxford Pennant Original"; https://oxfordpennant.com/products/liberty-for-all-championship-banner-chrome-yellow-x-office-of-brothers-x-oxford-pennant-original/.

*Primary Examiner* — Shin H Kim
(74) *Attorney, Agent, or Firm* — David E. Novak; Brannon Sowers & Cracraft PC

(57) ABSTRACT

A method for decorating a wall, including the steps of affixing a plurality of spaced hooks to the wall, engaging each respective hook with an eyelet formed through a first mounting portion, and removably attaching a first display portion to the mounting portion. The mounting portion includes a first hook and loop type connector operationally connected thereto. The first display portion includes a second hook and loop type fastener connected thereto. The method further includes the steps of detaching the first display portion from the mounting portion and then attaching a second display portion to the mounting portion.

5 Claims, 5 Drawing Sheets

(56) References Cited

U.S. PATENT DOCUMENTS

| | | | | |
|---|---|---|---|---|
| 8,915,208 | B2 * | 12/2014 | Shanahan | G09F 21/04 40/591 |
| 2003/0217685 | A1 * | 11/2003 | Aldridge | G09F 17/00 116/173 |
| 2004/0134108 | A1 * | 7/2004 | Harari | G09F 7/04 40/591 |
| 2006/0086024 | A1 * | 4/2006 | Kennedy | G09F 7/00 40/597 |
| 2006/0225322 | A1 * | 10/2006 | O'Leary | B42F 21/06 40/359 |
| 2007/0006498 | A1 * | 1/2007 | Collins | G09F 17/00 40/610 |
| 2007/0107284 | A1 * | 5/2007 | Lamothe | G09F 7/22 40/604 |
| 2008/0301988 | A1 * | 12/2008 | Strader | G09F 17/00 40/604 |

* cited by examiner

HANGING HOME DECORATION ASSEMBLY AND METHOD OF USE

BACKGROUND

A great many people enjoy seasonally decorating the exterior of their home. In some neighborhoods, the competition is fierce. Popular among home decorations are hanging flags, pennants, chevrons or the like. These decorations are expansive and may be made of such materials as canvas, heavy cloth, or the like. Such decorations are entertaining and attractive. However, the irregular shape and large, bulky nature of these hanging decorations makes them difficult to efficiently store when not in use as well as difficult to deploy and/or remove form exhibition.

Thus, there is a need for a more efficient decorating assembly that may be easily deployed and just as easily stored when not in use. The present invention addresses these needs.

BRIEF DESCRIPTIONS OF THE DRAWINGS

Figure 1:
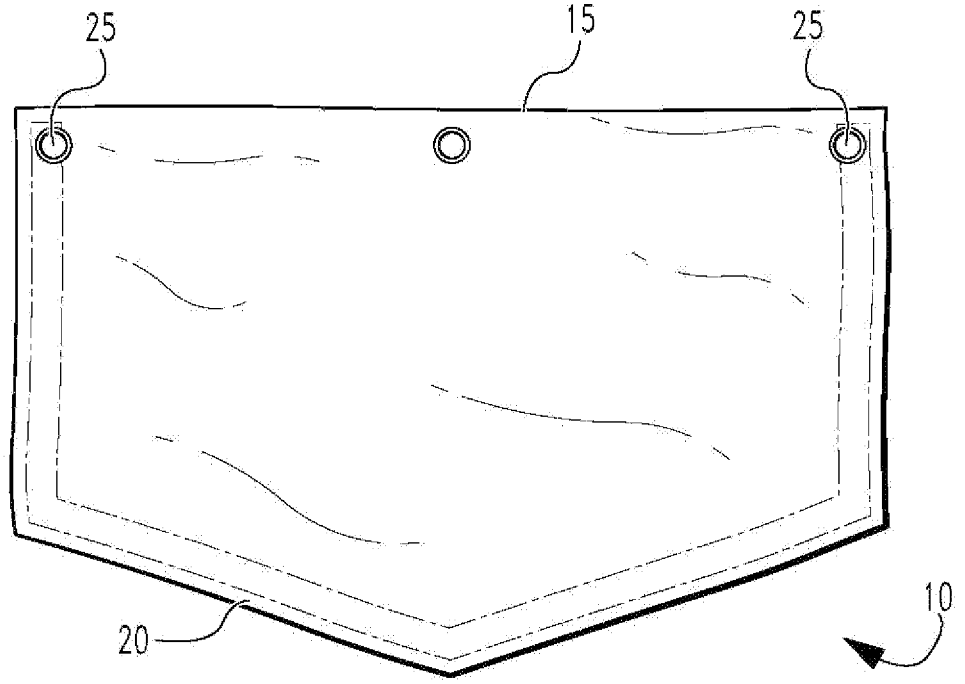

FIG. 1. is an elevation view of a house decoration according to a first embodiment of the present invention.

Figure 2:
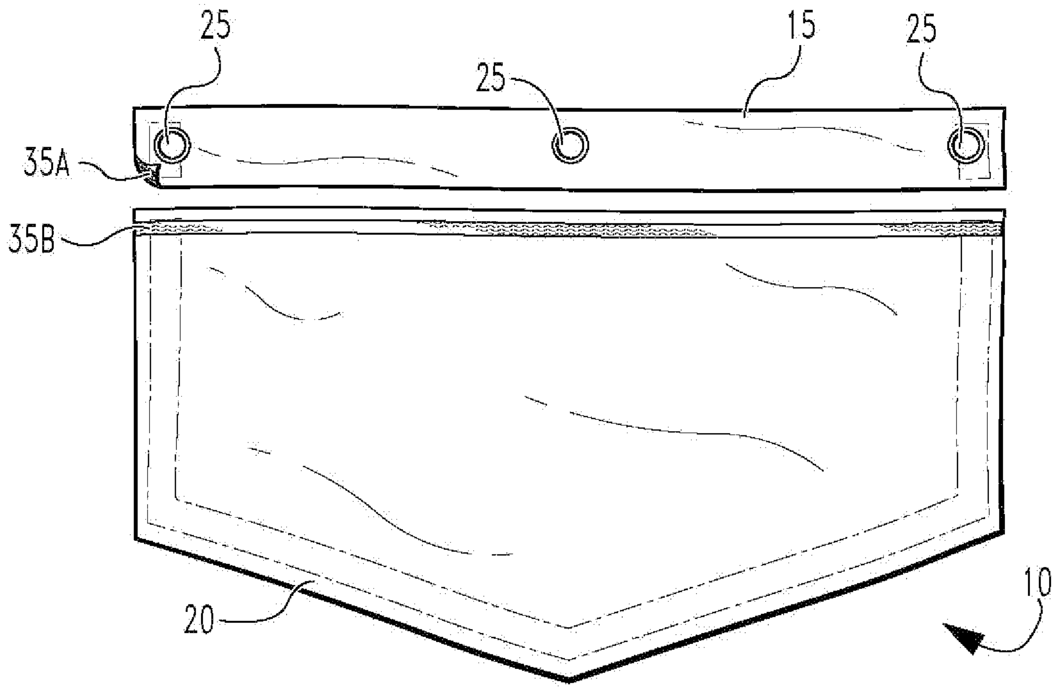

FIG. 2. is an elevation view the embodiment of FIG. 1 with the mounting portion separated from the display portion.

Figure 3:
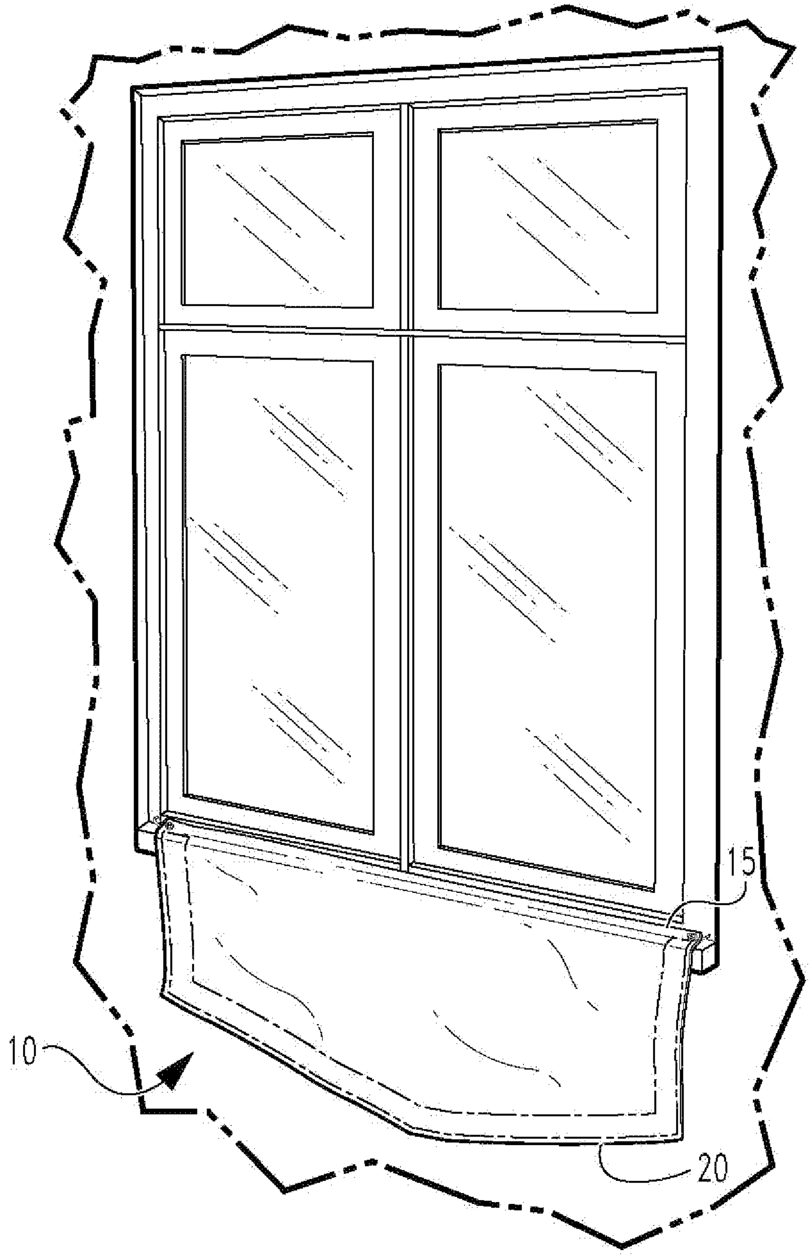

FIG. 3. is a perspective view of the embodiment of FIG. 1 as deployed to decorate a house.

Figure 4:
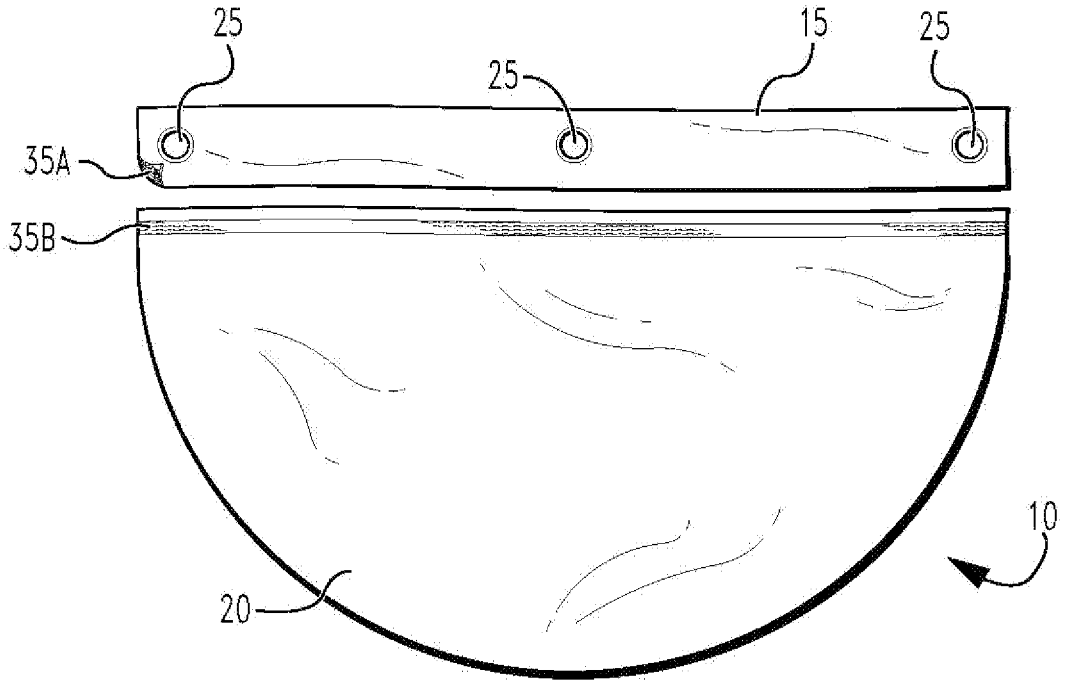

FIG. 4. is an elevation view of a house decoration according to a second embodiment of the present invention.

Figure 5:
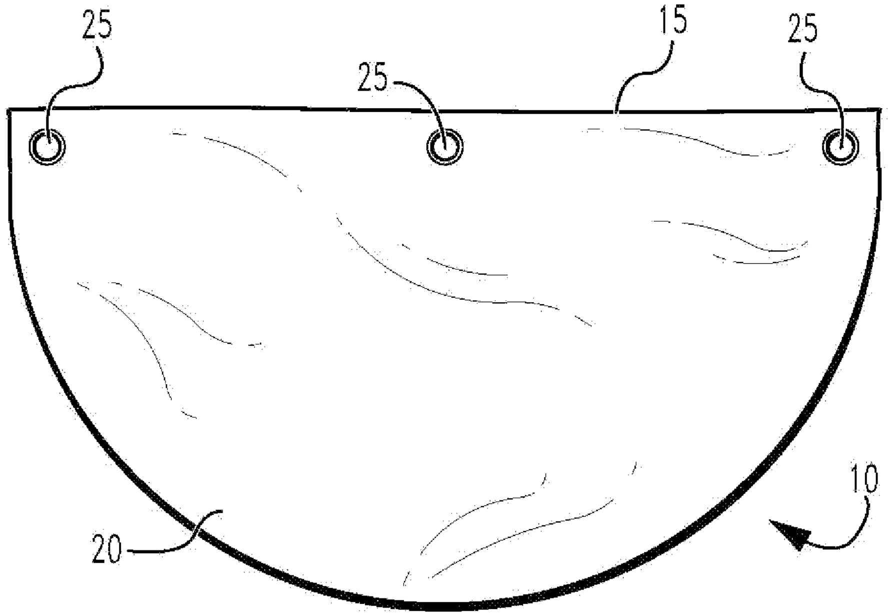

FIG. 5. is an elevation view the embodiment of FIG. 4 with the mounting portion separated from the display portion.

Figure 6:
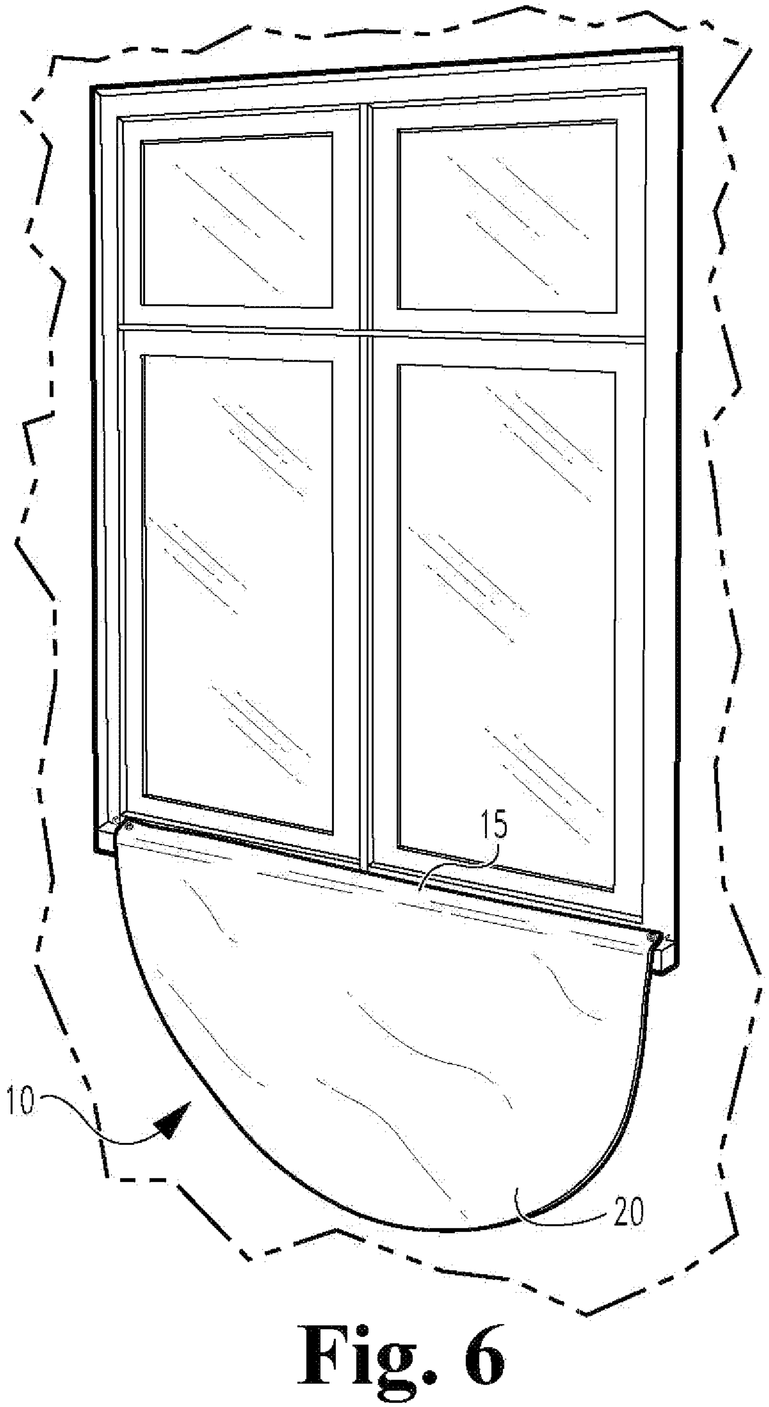

FIG. 6. is a perspective view of the embodiment of FIG. 4 as deployed to decorate a house.

Figure 7:
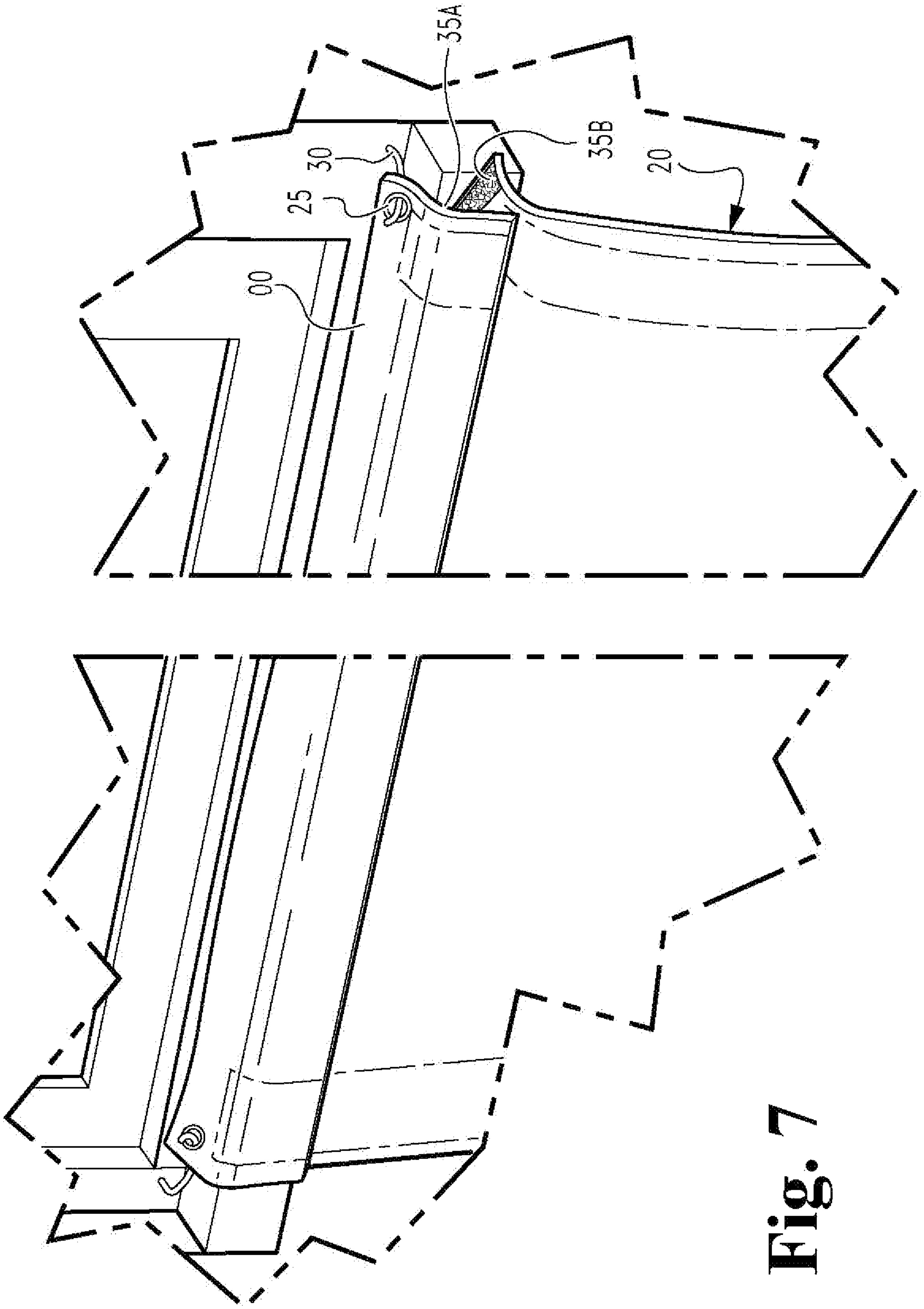

FIG. 7 is a partial perspective view of the embodiment of FIG. 6.

DETAILED DESCRIPTION

Before the present methods, implementations, and systems are disclosed and described, it is to be understood that this invention is not limited to specific synthetic methods, specific components, implementation, or to particular compositions, and as such may, of course, vary. It is also to be understood that the terminology used herein is for the purpose of describing particular implementations only and is not intended to be limiting.

As used in the specification and the claims, the singular forms "a," "an" and "the" include plural referents unless the context clearly dictates otherwise. Ranges may be expressed in ways including from "about" one particular value, and/or to "about" another particular value. When such a range is expressed, another implementation may include from the one particular value and/or to the other particular value. Similarly, when values are expressed as approximations, for example by use of the antecedent "about," it will be understood that the particular value forms another implementation. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not. Similarly, "typical" or "typically" means that the subsequently described event or circumstance often though may not occur, and that the description includes instances where said event or circumstance occurs and instances where it does not.

A hangable home decoration 10 according to one embodiment of the present disclosure comprises a mounting portion 15 (also called a wall-attaching portion 15) and a display portion 20 (also called a hanging portion). The mounting portion 15 typically includes a plurality of eyelets 25 (also called apertures 25) formed therethrough for engaging hooks 30 or like fasteners connected to a house interior or exterior surface for deploying and displaying the decoration 10. The eyelets 25 are typically reinforced with a structural material, such as metal, plastic, or the like. The mounting portion 15 further includes a strip of fastening material 35A, such as one part of a hook and loop connector pair.

The display portion 20 may be of any desired shape, size, and length, such as an elongated pennant, a semicircle, a chevron, or the like, and typically includes a strip of fastening material 35B that may lockingly engage the other strip of fastening material 35A connected to the mounting portion. Fasteners 35A, 35B are removably attachable/reattachable with one another. The mounting and display portions 15, 20 may thus be removably connected together by engaging and disengaging the connector strips 35A, 35B; different display portions 20 of the same or different shapes may be attached to the mounting portion 15 so as to vary the appearance of the decoration 10 without the need of dismounting the decoration 10 from the wall each time a new decorative design is desired to be displayed while simultaneously minimizing the bulk and volume of display material to be stored for later use/reuse.

In operation, the home decoration 10 may be used to decorate a wall, either an exterior or interior wall, by first affixing a plurality of spaced hooks 30 to the wall, engaging each respective hook 30 with one of the eyelets 25 formed through the first mounting portion 15, and removably attaching the first display portion 20 to the mounting portion 15. The mounting portion 15 includes a first hook and loop type connector 35A operationally connected thereto. The first display portion 20 includes a second hook and loop type fastener 35B connected thereto. Eventually, it may be desired to detach the first display portion 20 from the mounting portion 15 and attach a second, different display portion 20 to the mounting portion 15 while the mounting portion 15 remains connected to the wall.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to nigh-infinite subcombinations or variations of a subcombination.

I claim:

1. A decorative hanging display, comprising:

a wall-attaching portion;

a plurality of spaced, reinforced apertures formed through the wall-attaching portion;

a first fastening portion operationally connected to the wall-attaching portion;

a hanging portion;

a second fastening portion operationally connected to the hanging portion;

wherein the wall-attaching portion and hanging portion are removably attachable to one another by the respective first and second fastening portions;

wherein the hanging portion hangs below the wall attaching portion when the first and second fastening portions are attached to one another.

2. The decorative hanging display of claim 1 wherein the first and second fastening members are matable hook and loop type fasteners.

3. The decorative hanging display of claim 1 and further comprising a plurality of hanging portions, wherein each respective hanging portion has a respective second fastening portion operationally connected thereto.

4. A method for decorating a wall, comprising:

a) affixing a plurality of spaced hooks to the wall;

b) engaging each respective hook with an eyelet formed through a wall-attaching portion having a first mounting portion;

c) removably attaching a first display portion having a second mounting portion to the wall-attaching portion by attaching the first mounting portion to the second mounting portion such that the first display portion hangs below the mounting portion;

wherein the first mounting portion includes a first hook and loop type connector operationally connected thereto; and wherein the second mounting portion includes a second hook and loop type fastener connected thereto.

5. The method of claim 4 and further comprising:

d) detaching the first display portion from the wall-attaching portion;

e) attaching a second display portion to the wall-attaching portion such that the second display portion hangs below the mounting portion;

wherein the second display portion includes a second hook and loop type fastener connected thereto.

* * * * *